June 23, 1959  D. J. GAFFNEY  2,891,568
PNEUMATIC CLUTCH TYPE PANEL LOADER FOR INTERLOCK SYSTEM
Filed June 29, 1953  2 Sheets-Sheet 2
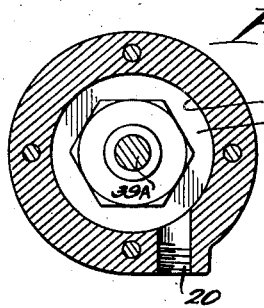
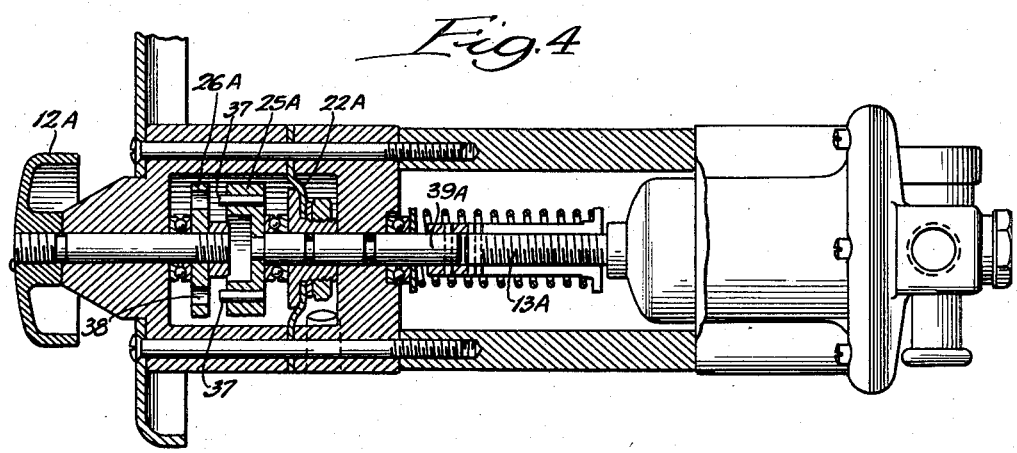
INVENTOR:
Donald J. Gaffney,
BY
Bair, Freeman & Molinare
ATTORNEYS.

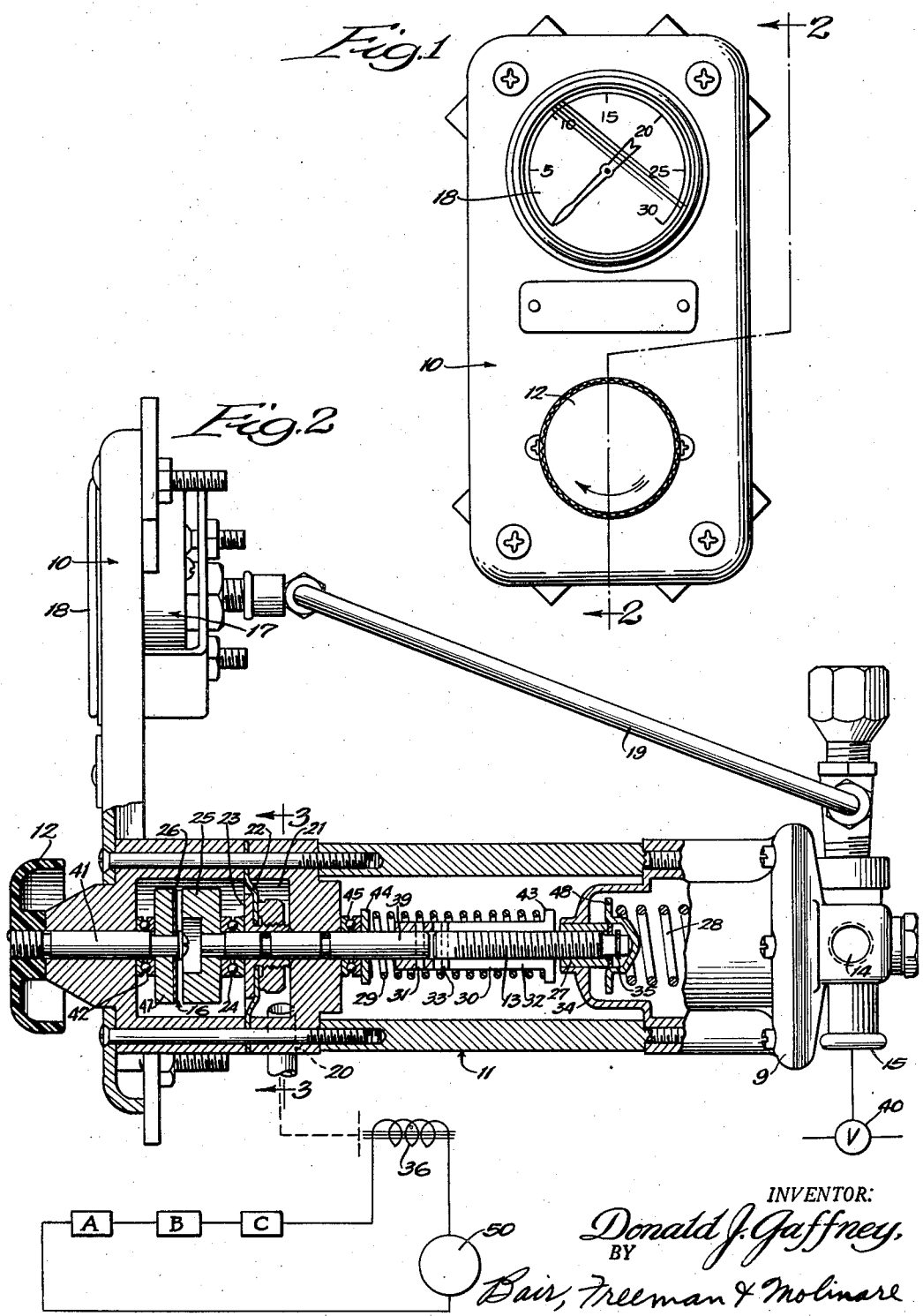

United States Patent Office 2,891,568
Patented June 23, 1959

2,891,568

PNEUMATIC CLUTCH TYPE PANEL LOADER FOR INTERLOCK SYSTEM

Donald J. Gaffney, Marshalltown, Iowa, assignor to Fisher Governor Company, Marshalltown, Iowa, a corporation of Iowa Application June 29, 1953, Serial No. 364,595

2 Claims. (Cl. 137—495)

This invention relates generally to a clutch device for use in conjunction with pressure regulators and the like, and is particularly applicable for use as a safety means with assemblies of the type commonly known in the trade as "panel loaders," such assemblies comprising a conventional pressure regulator mounted on a panel together with a pressure gage.

One object of the invention is to provide a clutch device responsive to predetermined conditions and operating as an interlock to control the actuation of a pressure regulator for a pneumatically operated valve or the like.

Another object of the invention is to prevent the operation of a pneumatically actuated unit in a system until some other operation in that system has been performed, or until some predetermined condition has been met.

A further object of the invention is to provide a small and compact clutch interlock for use with a "panel loader," the entire unit being pre-assembled and adapted to be readily inserted through a relatively small aperture in a control panel for simple and speedy mounting.

Other objects and advantages will become apparent from the following description and appended claims taken in connection with the accompanying drawings wherein:

Figure 1 is a front elevation of a "panel loader" embodying my invention, and shows a pressure gage and the manual control knob of a pressure regulator mounted on a panel.

Figure 2 is a side elevation partly in vertical section along line 2—2 of Figure 1.

Figure 3 is a vertical sectional view taken along line 3—3 of Figure 2.

Figure 4 is a side elevation partly broken away and partly in vertical cross section, showing a modified form of my invention.

*Description and operation of Figures 1 to 3*

On the accompanying drawing I have used the reference numeral 10 to indicate the mounting panel of a panel loader embodying my invention. The panel loader comprises an assembly generally indicated at 11, having a pressure regulator valve 9 and a control means therefor. The control means comprises a control knob 12, an adjusting means in the form of a screw 13, and a spring 28 bearing against a flanged cap 48, which seats on the end of the screw 13, and against a diaphragm (not shown) of regulator valve 9. The valve 9 is provided with a flow inlet 14 and an outlet 15. A clutch means 16 is positioned between the knob 12 and the screw 13 to provide an operative connection therebetween. An output pressure gage 17, having an indicator face 18, is operatively connected by a pressure line 19 to the output of the pressure regulator valve 9. In general, the output pressure from the regulator may be applied to the diaphragm casing of a large main valve, or some similar pressure responsive device, located some distance away, and indicated schematically in Figure 2 at 40. By manually turning the knob 12 of the pressure regulator, the main valve 40 or other device to be actuated may be positioned, the pressure gage 17 indicating the diaphragm pressure or loading pressure thereof.

The clutching device 16 is responsive to a supply of air applied at a connection 20. Air admitted thereto enters a chamber 21 within the assembly 11, where it reacts against a flexible diaphragm 22 which is operatively connected to a plate 23, bearing 24, and clutch plate 25 carried by the stem 39. As the diaphragm is moved to the left, as seen in Figure 2, the plate 25 carried by the stem 39 is pressed against an opposed clutch plate 47 having a leather clutch facing 26, and frictionally seating therewith. The plate 47 is operatively connected to the knob 12 by a stem 41 having bearings 42. Rotary motion may thereby be transmitted from the knob 12 to the adjusting screw 13, the latter threading in or out of a bushing 27 in a bonnet 34, and causing the spring 28 which bears against the diaphragm of the regulator valve to compress or elongate, and thus produce an increase or decrease in the outlet pressure from the panel loader unit.

The movement of the plate 25 and stem 39 to the left in Figure 2 is opposed by a spring 29 which encompasses portions of the stem 39 and screw 13. A drive yoke 30 is fixed by a pin 31 to the stem 39. The spring 29 seats against a flange 43 of the yoke 30, and against a disk 44 which is slidably carried by the stem 39 and positioned against a bearing 45. The spring 29 is biased so as to exert a force tending to carry the yoke 30 and stem 39 to the right as seen in Figure 2. When the pressure in chamber 21 is at zero or some low value, the plate 25 is withdrawn from contact against the leather facing 26, and rotary movement of the knob 12 is not transmitted to the adjusting screw 13.

The drive yoke 30 is cylindrical in form, having two oppositely disposed slots 32 through which a second pin 33 moves from left to right in Figure 2 as the adjusting screw 13 advances or withdraws from the bushing 27 in bonnet 34. The adjusting screw 13 is provided with a retaining washer 35 to prevent the screw from withdrawing so far that disengagement of the clutch would be prevented.

In departing from the usual construction of conventional panel loaders, I have provided clutching device 16 to engage or disengage the knob 12 and the screw 13 in response to external conditions or operations. In certain systems operations it is often essential that a main valve or other regulated device remain inoperative until some other operation in the system is performed, or until some external condition has occurred. For example, in the interchangeable use of two fuels such as gas and oil in a stream generating system, a certain sequence of operations is required for safety reasons when changing from one fuel to another. Such a regulated sequence of operations is commonly known in the trade as an "interlock system." Usually an electrical system coordinates the various operations of the sequence which involves the gas valve, steam purge valve, igniter, and oil valve, and it is essential that an operator be unable to open the oil valve until (1) the gas valve is closed, (2) the line has been purged with steam, and (3) the igniters have been turned on. I have indicated such a sequence of steps diagrammatically in Figure 2, wherein A, B, and C represent a series of individual operations which must be accomplished in order to energize a solenoid 36 of a suitable electrical circuit, which in turn actuates suitable valve means to permit a supply of air to enter the panel loader at connection 20, in response to a source of current 50.

*Description and operation of Figure 4*

It is apparent that the pressure fluid activated clutching device to be used in a panel loader unit of the character disclosed may be designed and constructed in a variety of ways. In Figure 4, I have illustrated another clutch for use in the manner of my invention. A male clutch plate 25A and stem 39A are moved by deflection of a diaphragm 22A to the left in the same manner as the structure illustrated by Figure 2. Pins 37 of plate 25A are thereby engaged in holes 38 of a female clutch plate 26A. Rotary motion may then be transmitted from the control knob 12A to the adjusting screw 13A. The structure and operation of the panel loader of Figure 4 is identical to that of Figures 1 to 3 except as to the specific method of mechanical clutching. The particular clutching designs which I have illustrated have the advantages of simple operation and compact size, and are therefore to be preferred over larger and more complex clutches of the pressure fluid activated type.

The clutching device of Figure 14 is particularly adaptable for use with relatively low operating pressures, say of the order of 25 p.s.i. maximum. In applications where it is desirable to utilize "plant air" (usually of the order of 100 p.s.i. maximum), the friction clutch of Figures 1 to 3 is more desirable. The leather disk clutch would be undesirable at low pressures because it would allow slippage, and the male pin clutch requires a slight twist of the control knob to secure alignment of the pins in the holes and would produce excessive stress on the pins and severe galling at high operating pressures. The particular clutch to be selected is dependent upon the operating conditions under which it is to be used.

From the foregoing description, it is believed that the operation and advantages of my invention will be apparent, but the embodiments shown are merely intended as illustrative of the scope of my invention as defined in the appended claims.

I claim:

1. In a panel loader of the type operative to transmit an output pressure to a pressure responsive device and including a pressure regulator valve having an adjustable bias for controlling the output pressure thereof, and adjusting means operative to vary the bias of said valve, the improvement comprising control means having a free actuator portion and being coupled to said adjusting means, said control means having a clutch interlock normally biased in disengaged position to prevent the transmission of movement of said actuator portion to said adjusting means, means forming a fluid tight chamber about said clutch interlock, and means responsive to the occurrence of a predetermined condition for admitting a pressure fluid to said chamber, said clutch interlock being responsive to a predetermined operating pressure within said chamber to effect engagement whereby movement of said actuator portion may then be transmitted to said adjusting means for varying the output pressure of said regulator valve.

2. In a panel loader of the type operative to transmit an output pressure to a pressure responsive device and including a pressure regulator valve having an adjustable bias for controlling the output pressure thereof, and adjusting means operative to vary the bias of said valve, the improvement comprising control means including first and second axially aligned shaft members, said first shaft having a free actuator portion and said second shaft being coupled to said adjusting means, said shafts carrying normally-spaced opposed clutch elements providing an interlock therebetween to prevent the transmission of movement of said actuator portion to said adjusting means, means forming a fluid tight chamber about said clutch elements, and means responsive to the occurrence of a predetermined condition for admitting a pressure fluid to said chamber, at least one of said clutch elements being responsive to a predetermined operating pressure within said chamber to effect engagement with the other whereby movement of said actuator portion may then be transmitted to said adjusting means for varying the output pressure of said regulator valve.

References Cited in the file of this patent

UNITED STATES PATENTS

| | | |
|---|---|---|
| 251,980 | Westinghouse | Jan. 3, 1882 |
| 763,162 | Curran | June 21, 1904 |
| 792,152 | McElroy | June 13, 1905 |
| 992,502 | Hollis | May 16, 1911 |
| 1,261,090 | Ziesterer | Apr. 2, 1918 |
| 1,611,545 | Maybach | Dec. 21, 1926 |
| 2,215,597 | Semon | Sept. 24, 1940 |
| 2,691,436 | Lowry | Oct. 12, 1954 |